United States Patent [19]

Tsuji

[11] Patent Number: 5,801,872
[45] Date of Patent: Sep. 1, 1998

[54] SEMICONDUCTOR OPTICAL MODULATION DEVICE

[75] Inventor: Masayoshi Tsuji, Tokyo, Japan

[73] Assignee: NEC Corporation, Tokyo, Japan

[21] Appl. No.: 598,099

[22] Filed: Feb. 7, 1996

[30]  Foreign Application Priority Data

Feb. 9, 1995 [JP] Japan .................. 7-021427

[51] Int. Cl.$^6$ ............... G02F 1/025; H01L 31/107
[52] U.S. Cl. ............... 359/248; 359/256; 359/229; 257/17
[58] Field of Search ............... 359/248, 256, 359/279, 315; 257/17

[56] References Cited

U.S. PATENT DOCUMENTS

| | | | |
|---|---|---|---|
| 5,204,539 | 4/1993 | Tsuyi et al. | 257/21 |
| 5,471,068 | 11/1995 | Tsuyi et al. | 257/21 |
| 5,517,350 | 5/1996 | Cabera et al. | 359/326 |
| 5,539,221 | 7/1996 | Tsuyi et al. | 257/186 |
| 5,617,446 | 4/1997 | Ishibashi et al. | 372/96 |

FOREIGN PATENT DOCUMENTS

| | | |
|---|---|---|
| 6291359 | 10/1994 | Japan . |
| 8220496 | 8/1996 | Japan . |

OTHER PUBLICATIONS

Ryu et al, Thin Solid Films (Swiss), vol. 248, #1, pp. 63–68, Aug. 1994; Abst. only herewith.

H. Sano et al., "InGaAs/InAlAs MQW Optical Modulator", Technical Report of the Group for the Study of Photon Electronics of the Electronic Information Communication Society of Japan, No. OQE91–57, pp. 69–74.

S. Nishimura, Electrooptic Effects in an InGaAs/InAlAs Multiquantum Well Structure, IEEE Photonics Technology Letters, 4(10): 1123–1126 (1992).

Hiroshima et al. "Quantum–confined Stark Effect in Graded–gap Quantum Wells", Journal of Applied Physics, Oct. 15, 1987, USA, vol. 62, No. 8, pp. 3360–3365.

Saunders "Absorptive Electro–Optic Spatial Light Modulators: Effect of Well Profile on Device Performance", Applied Physics Letters, Sep. 4, 1989, USA, vol. 55, No. 10, pp. 930–932.

Chang et al. "Optical Properties of Hg/sub 1–x/Cd/sub x/Te Sawtooth Suerlattices", Journal of Applied Physics, Jul. 15, 1989, USA, vol. 66, No. 2, pp. 928–834.

Sasaki et al. "Novel Structure Photonic Devices Using Selective MOVPE Growth", NEC Research and Development, Jul. 1992, Japan, vol. 33, No. 3, pp. 372–382.

Aoki et al. "New Photonic Device Integration by Selective–Area MOVPE and Its Application to Optical Modulator/Laser Integration", Microwave and Optical Technology Letters, Feb. 20, 1994, vol. 7, No. 3, pp. 132–139.

*Primary Examiner*—Nelson Moskowitz
*Attorney, Agent, or Firm*—Foley & Lardner

[57] ABSTRACT

The invention provides a semiconductor optical modulation device which has low power dissipation, high extinction ratio and high speed response features. An n-type InP clad layer, an n$^-$-type InAlAs-InAlGaAs composition inclination multiple layer, a p-type InP clad layer and a p$^+$-type InGaAs contact layer are layered on an n-type InP substrate. The layers are etched up to an intermediate location of the n-type clad layer to form a rib waveguide, and a positive electrode is formed on an upper portion of the rib waveguide. Further, a negative electrode is formed on the substrate.

4 Claims, 12 Drawing Sheets

SEMICONDUCTOR OPTICAL MODULATION DEVICE

BACKGROUND OF THE INVENTION

1. Field of the Invention

This invention relates to a semiconductor optical modulation device, and more particularly to semiconductor optical modulation device of the electro-absorption type or the refractive index-controlled type having low power dissipation, high speed response and high extinction ratio features.

2. Description of the Related Art

Optical fiber communication systems have exhibited remarkable development in recent years, and large capacity optical communication systems of 400 Mb/s, 1.6 Gb/s and so forth have been introduced not only into Japan but also between Japan and several foreign countries using submarine cables. In those optical communication systems, a semiconductor laser is conventionally modulated directly. However, for the future realization of very high speed, large capacity optical transmission systems of 10 Gb/s, 40 Gb/s and so forth, the direct modulation system of a semiconductor layer is being gradually replaced with the external modulator system which employs an optical semiconductor device which operates based on a change in absorption of light or a change in refractive index of light in principle. Therefore, the significance in development of an external modulator of a higher performance is increasing.

An electro-absorption type optical modulation device and a refractive index change type optical modulation device which are representative optical semiconductor devices for use with the external modulator system are superior in terms of miniaturization and facility of optical communication apparatus, and have been reported in many publications. For example, an electro-absorption type optical modulation device is disclosed in Technical Report of the Group for the Study of Photon Electronics of the Electronic Information Communications Society of Japan, No. OPE91-57, pp.69–74, and a refractive index change type optical modulation device is disclosed in *IEEE Photonics Technology Letters*, Vol. 4, 1992, pp.1123–1126. Some of optical modulation devices of the types mentioned are now commercially available.

Figure 10A:
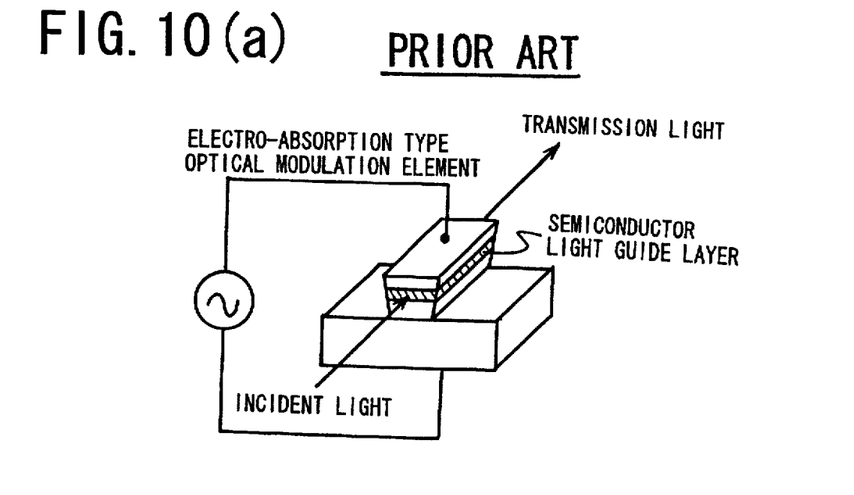
FIG. 10(a) is a perspective view of a conventional electro-absorption type optical modulation device.
Figure 10B:
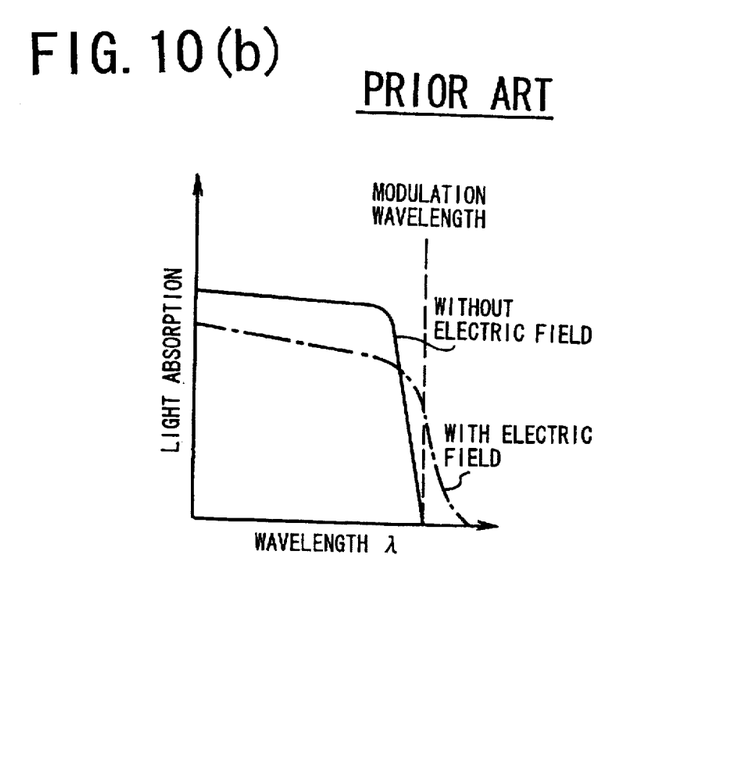
FIGS. 10(b) and 10(c) are diagrams showing a light absorption spectrum of a device wherein a semiconductor light guide layer is formed as a bulk layer and a light absorption spectrum of another device wherein a semiconductor light guide layer is formed as a type I superlattice, respectively, and illustrating a principle of operation of the electro-absorption type optical modulation device of FIG. 10(a) and illustrating the field dependency of the absorption coefficient.
Figure 10C:
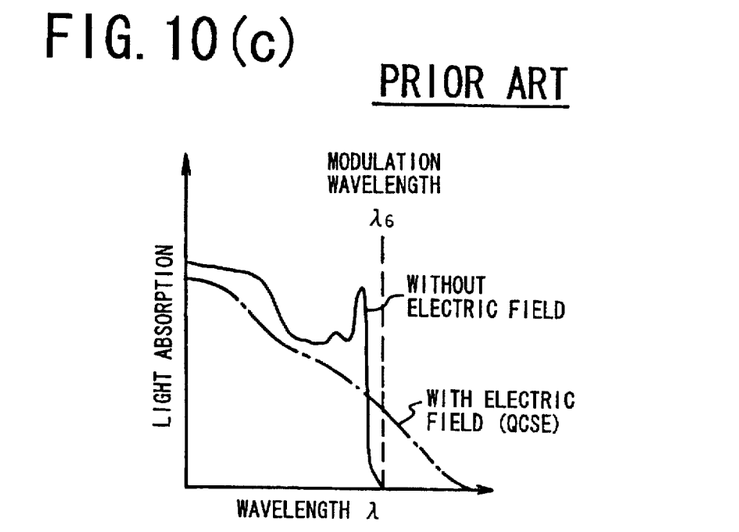

As a basic operation principle of an electro-absorption type optical modulation device, the Franz-Keldish effect of a bulk semiconductor layer shown in FIG. 10(b) or the quantum confined Stark effect (QCSE) of the type I superlattice shown in FIG. 10(c) is known well. A general construction of a conventional electro-absorption type optical modulation device which makes use of the Franz-Keldish effect or the QCSE is shown in FIG. 10(a). As seen from FIG. 10(a), the conventional electro-absorption type optical modulation device generally has, as a basic structure, a p-i-n structure wherein a non-doped light absorption layer is held between a p-type clad layer and an n-type clad layer. The electro-absorption type optical modulation device modulates light by controlling the degree of absorption of the light in a frequency in the proximity of an optical absorption edge as seen in FIG. 10(b) or 10(c) (in a modulation frequency illustrated in FIG. 10(a) or 10(b)) by applying an electric field to the electro-absorption type optical modulation device.

Figure 11:
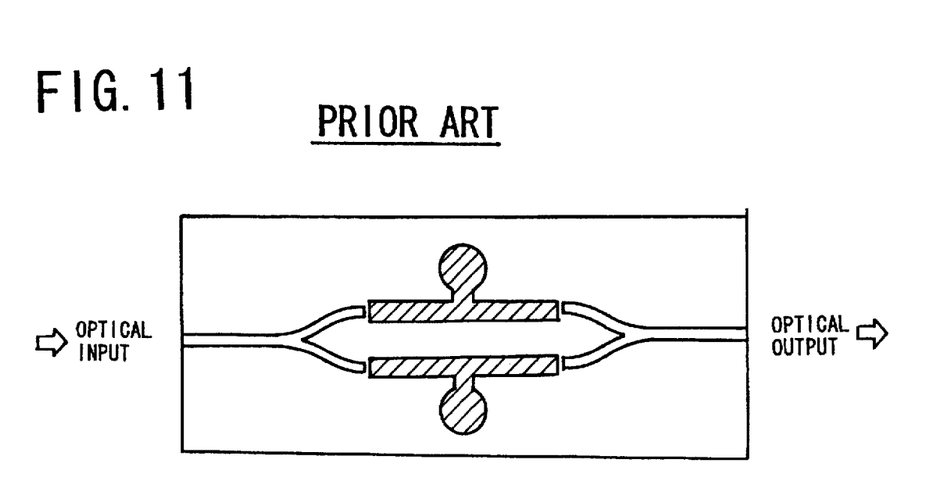
FIG. 11 is a schematic top plan view of a conventional optical modulation device of the refraction index controlled type.

A general construction of a refractive index change type optical modulation device of the Mach-Zehnder type is shown in FIG. 11. As a basic principle of the refractive index change type optical modulation device of the Mach-Zehnder type shown in FIG. 11, incident light is split into two beams by a Y branching waveguide and then enters into a modulation area. In the modulation area, an external electric field can be applied to reverse the phase of the incident light, and consequently, the two beams can be combined with each other by another Y branching waveguide at the rear stage to thus optically modulate the incident light. Since the refractive index change type optical modulation device employs light of a longer wavelength than the absorption edge as optical modulation light, it has a characteristic in that it does not suffer from production of optical carriers by absorption of light and is essentially possible to operate at a high speed. Further, while the electro-absorption type optical modulation device has a limited transmission distance because of the problem of chirping, the influence of chirping can be reduced with the refractive index change type optical modulation device, and accordingly, the refractive index change type optical modulation device is expected as an external modulator for high speed, large capacity optical transmission exceeding 10 Gb/s.

The conventional electro-absorption type optical modulation device described above has, in addition to the problem of chirping, the following problems. In particular, with the electro-absorption type optical modulation device shown in FIG. 10(a), when an electric field is applied to it, the wavelength at the optical absorption edge is shifted to the longer wavelength side (red shift) as seen from FIGS. 10(b) and 10(c). However, where the electro-absorption type optical modulation device makes use of the Franz-Keldish effect (FIG. 10(b)), it has a problem in that a considerably high electric field is required as the electric field to be applied. On the other hand, where the QCSE is made use of, the electro-absorption type optical modulation device can operate with a comparatively low electric field. However, since the QCSE is caused by polarization of carriers in a superlattice well layer upon application of an electric field, the electro-absorption type optical modulation device has a problem in that, if the spatial separation of carriers is not sufficient, then the change in transition probability (change in absorption amount) is not sufficiently great and a sufficiently high extinction ratio cannot be assured and has another problem in that hole pileup of optical carriers generated by absorption of light occurs.

Meanwhile, the refractive index controlled type optical modulation device is required to have a great change in refractive index with respect to an electric field to a light transmission layer in order to achieve low power dissipation, high speed response and high extinction ratio features. To this end, a semiconductor superlattice of the type I is employed for the optical modulation (transmission) layer. Where the superlattice is employed, when an electric field is applied, a shift (red shift) of the absorption edge toward the longer wavelength side by the Stark effect occurs, resulting in occurrence of absorption of transmission light. Production of optical carriers by the absorption deteriorates the feature of the refractive index controlled type optical modulation device that it is essentially possible to operate at a high speed.

SUMMARY OF THE INVENTION

It is an object of the present invention to provide an electro-absorption type semiconductor optical modulation device which has a high extinction ratio by an efficient field effect.

It is another object of the present invention to provide a refractive index controlled type semiconductor optical modulation device which exhibits a great change in refractive index and responds at a high speed.

In order to attain the objects described above, according to an aspect of the present invention, there is provided a semiconductor optical modulation device of the electro-absorption type which includes a semiconductor optical modulation element which in turn includes, as a basic structure, a clad layer of one conduction type, a guide layer of the one conductive type and a clad layer of the other conduction type layered on a semiconductor substrate and modulates input light by a change in absorption of light when an electric field is applied to the semiconductor optical modulation device, wherein the guide layer includes a composition inclination multiple layer.

An optical semiconductor element such as a semiconductor laser, an optical amplifier or a waveguide may be formed on the semiconductor substrate together with the semiconductor optical modulation element.

Where a waveguide is formed on the semiconductor substrate together with the semiconductor optical modulation element, the semiconductor optical modulation element is preferably formed by a process including a selective growing step using a pair of dielectric thin film stripes formed on the semiconductor substrate in an opposing relationship to each other with an area, in which the waveguide is formed, interposed therebetween.

Figure 7A:
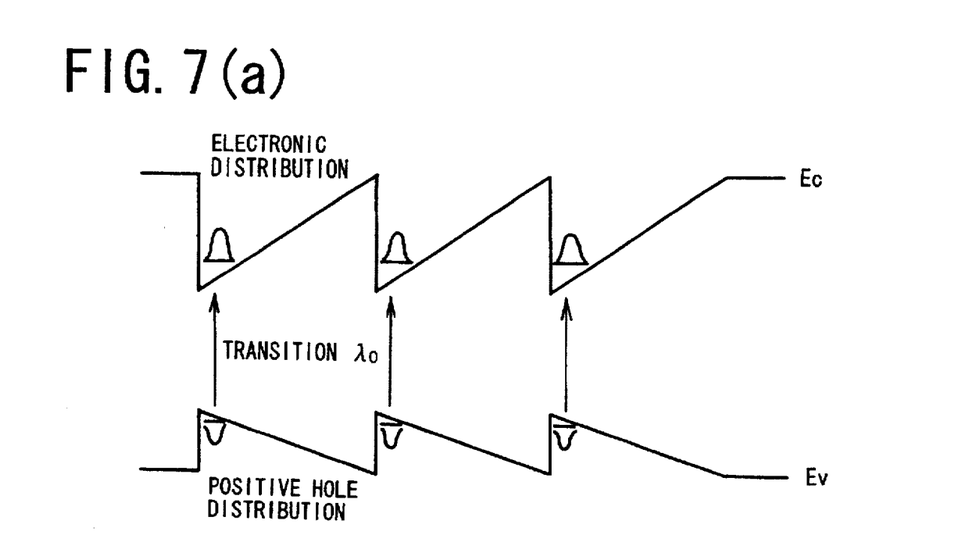
FIGS. 7(a) and 7(b) are diagrams showing band structures of a composition inclination multiple layer based on the basic principle of the present invention when no electric field is applied and when an electric field is applied, respectively.
Figure 7B:
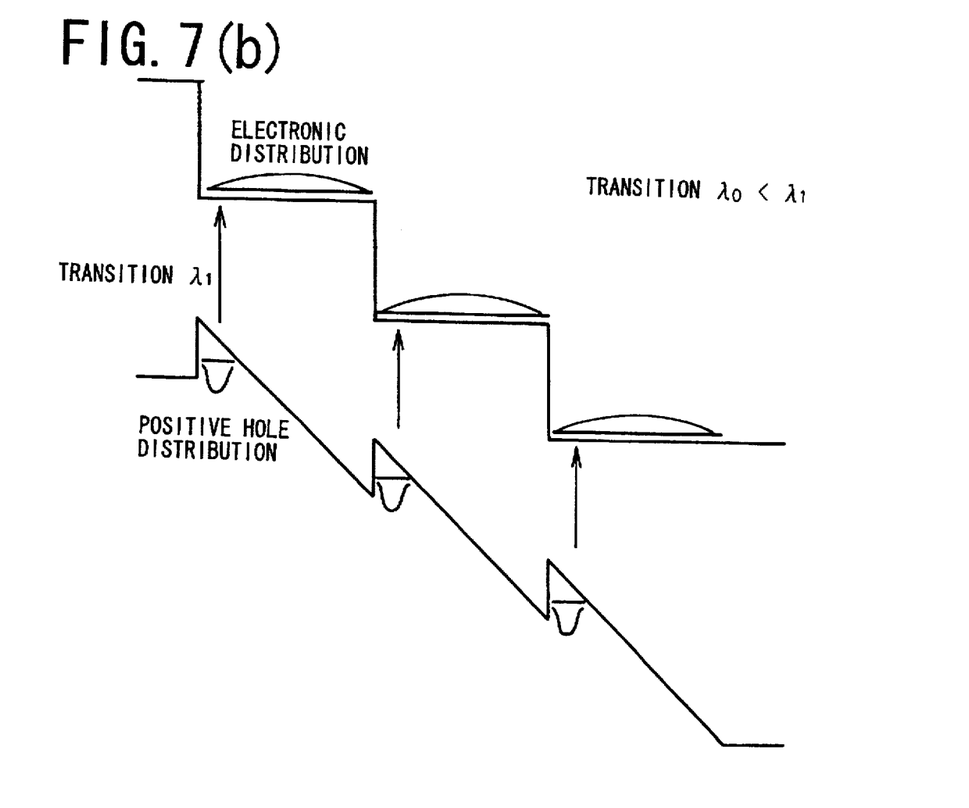

FIGS. 7(a) and 7(b) illustrate bands of the composition inclination multiple layer structure essential to the present invention. From FIGS. 7(a) and 7(b), it can be seen that the composition has a band structure like saw teeth exhibiting a stepwise variation.

Figure 8:
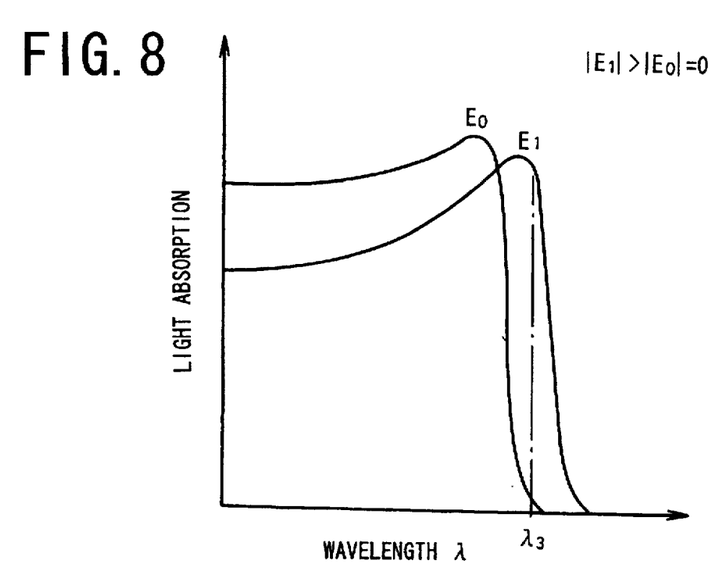
FIG. 8 is a diagram illustrating a light absorption characteristic of a plane device having a p-i-n diode structure.

FIG. 8 illustrates operation of the optical semiconductor (integrated) device described above and particularly illustrates a light absorption characteristic of the plane type device having a p-i-n structure wherein the composition inclination multiple layer is used as the i layer.

The variation in band of the composition inclination multiple layer upon application of a voltage is illustrated in FIG. 7(b) as described above, and the light absorption characteristic of FIG. 8 will be described with reference to FIG. 7(b). In the composition inclination multiple layer, when no electric field is applied (refer to FIG. 7(a)), electrons and positive holes are locally positioned in triangular potentials of the band. Since their distributions spatially overlap with each other, the transition probability is high, and a high absorption characteristic is obtained. On the other hand, when an electric field is applied, the band is inclined, resulting in weakening in containment of electrons while the confinement for positive holes in the triangular potentials increases. Since the distribution of electrons is spatially expanded, the transition probability becomes lower, and the entire absorption characteristic becomes low. However, the transition probability at the absorption edge is comparatively high since the positive holes are locally positioned. Consequently, the absorption characteristic illustrated in FIG. 8 is obtained. Here, the reason why the absorption edge upon application of an electric field is shifted to the longer wavelength is that containment of the electrons decreases, resulting in reduction of the quantum effect.

In FIG. 8, a high extinction ratio can be obtained at the wavelength $\lambda_3$. The level of the extinction ratio is higher than that by the Stark effect of the type I superlattice illustrated in FIG. 10(c) and is substantially similar to that by the Franz-Keldish effect obtained with a bulk semiconductor layer illustrated in FIG. 10(b).

Further, the applied voltage to obtain the high extinction ratio is very low comparing with that by the Franz-Keldish effect. Consequently, the optical modulation device of the electro-absorption type which makes use of the effect of the composition inclination multiple layer described above can operate with a low electric field and can obtain a high extinction ratio comparing with conventional devices.

According to another aspect of the present invention, there is provided a semiconductor optical modulation device of the refraction index controlled type which includes a semiconductor optical modulation element which in turn includes, as a basic structure, a clad layer of one conduction type, a guide layer of the one conductive type and a clad layer of the other conduction type layered on a semiconductor substrate, and electric field application means for causing a change in refractive index, and modulates input light by a change in absorption of light when an electric field is applied to the semiconductor optical modulation device, wherein the guide layer includes a composition inclination multiple layer.

The semiconductor optical modulation device may be of a Mach-Zehnder type which makes use of a change in phase of light caused by a change in refractive index.

An optical semiconductor element such as a semiconductor laser, an optical amplifier or a waveguide may be formed on the semiconductor substrate together with the semiconductor optical modulation element.

Where a waveguide is formed on the semiconductor substrate together with the semiconductor optical modulation element, the semiconductor optical modulation element is preferably formed by a process including a selective growing step using a pair of dielectric thin film stripes formed on the semiconductor substrate in an opposing relationship to each other with an area, in which the waveguide is formed, interposed therebetween.

Figure 9A:
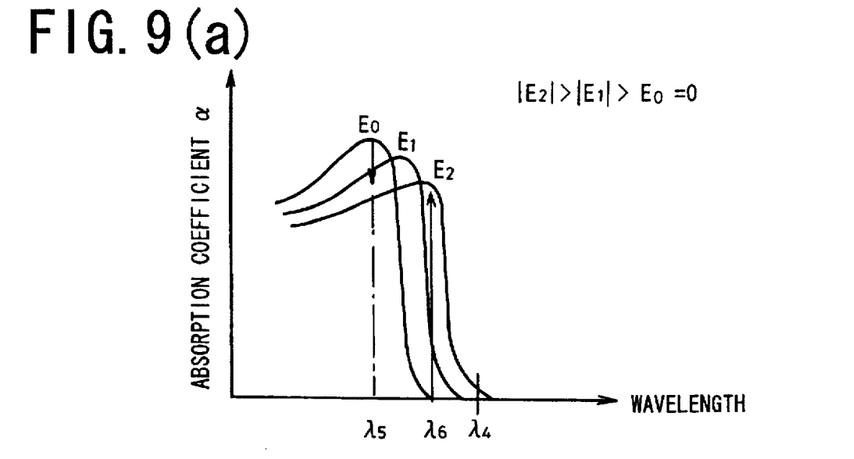
FIGS. 9(a) and 9(b) are diagrams illustrating a light absorption spectrum of a composition inclination multiple layer in a plane structure and a refraction index change spectrum of the composition inclination multiple layer calculated using the Kramers-Kronig relations based on the spectrum of FIG. 9(a), respectively.
Figure 9B:
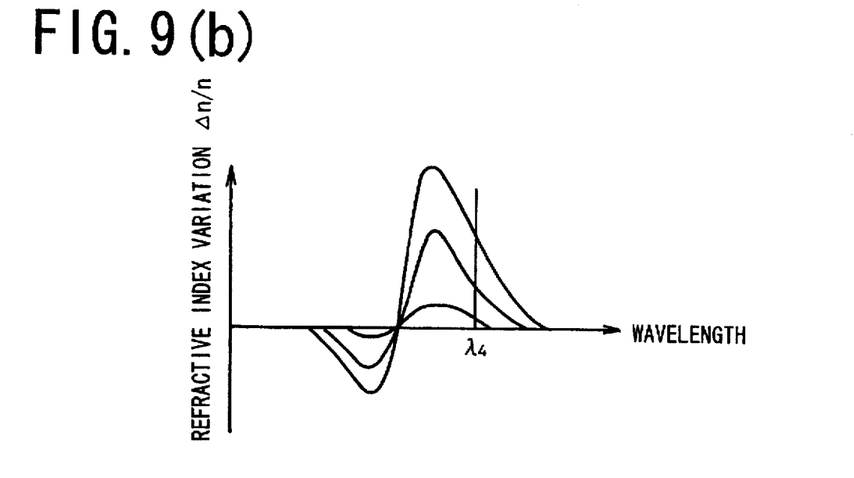

FIGS. 9(a) and 9(b) illustrate operation of the optical semiconductor (integrated) device of the second aspect of the present invention described above. In particular, FIG. 9(a) shows a light absorption spectrum of the composition inclination multiple layer described hereinabove with reference to FIG. 8. As described hereinabove, when an electric field is applied, the light absorption edge is shifted to the longer wavelength side. However, it was confirmed as a result of an experiment that, as different from that by the Stark effect of the type I superlattice, the absorption edge shift amount is small and steep. This is a characteristic obtained by using the composition inclination multiple layer. The light absorption spectrum of the composition inclination multiple layer includes, as seen from FIG. 9(a), a wavelength $\lambda_6$ which exhibits an increase in absorption coefficient and another wavelength $\lambda_5$ which exhibits a decrease in absorption coefficient.

In this instance, the refractive index change spectrum can be determined from the Kramers-Kronig relations and is such as illustrated in FIG. 9(b). It can be seen from FIG. 9(b) that the refractive index change spectrum exhibits, at a wavelength $\lambda_4$, a small change in absorption but exhibits a large variation in refractive index. In other words, where the wavelength $\lambda_4$ is employed as the modulation wavelength, a large change in refractive index can be obtained while suppressing deterioration in high speed response by absorption. In this regard, the composition inclination multiple layer is different from the type I superlattice with which high absorption occurs by the Stark effect. Consequently, an optical modulation element of the refractive index controlled type which exhibits a large variation in refractive index and can respond at a high speed can be realized.

In summary, according to the present invention, by employing a composition inclination multiple layer as a light absorption layer, a semiconductor optical modulation device which exhibits a large change in absorption and accordingly has a high extinction ratio can be obtained. Meanwhile, by employing a composition inclination multiple layer as a refractive index changing portion, a semiconductor optical modulation device which exhibits little change in light absorption and exhibits a large variation in refractive index can be obtained. Both devices have low power dissipation, high extinction ratio and high speed operation features.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1A:
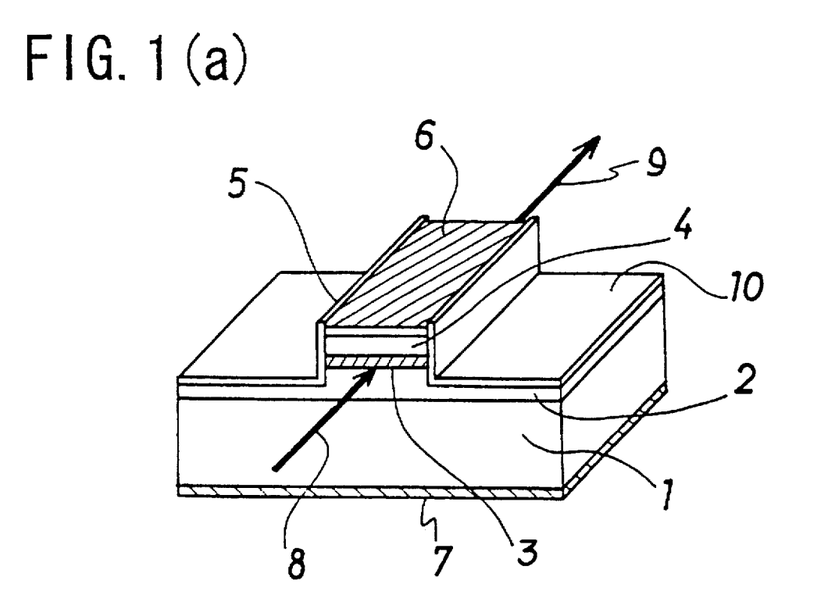
FIG. 1(a) is a perspective view of an electro-absorption type optical modulation device showing a preferred embodiment of the present invention.
Figure 1B:
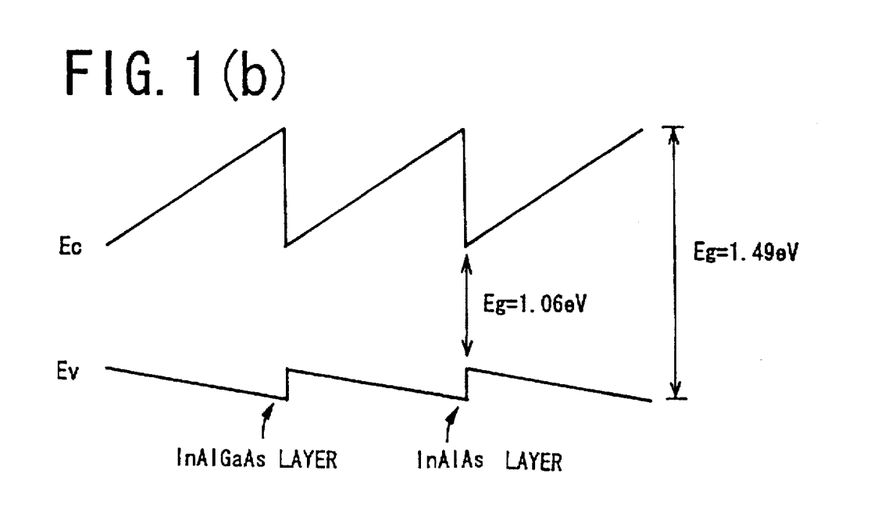
FIG. 1(b) is a diagrammatic view showing a band structure of a light absorption (transmission) layer of the electro-absorption type optical modulation device of FIG. 1(a)

FIG. 1(a) shows an electro-absorption type optical modulation device to which the present invention is applied, and FIG. 1(b) shows a band structure of a light absorption (transmission) layer of the electro-absorption type optical modulation device shown in FIG. 1(a). Referring to FIGS. 1(a) and 1(b), in production of the electro-absorption type optical modulation device, on an n-type InP (100) substrate 1, an n-type InP clad layer 2 ($n=5\times10^{17}$ $cm^{-3}$) of 0.5 μm thick, an $n^-$-type InAlAs-InAlGaAs (Eg=1.06 eV) composition inclination multiple layer 3 ($n=2\times10^{15}$ $cm^{-3}$) a p-type InP clad layer 4 ($p=5\times10^{17}$ $cm^{-3}$) of 1.5 μm thick and a $p^+$-type InGaAs contact layer 5 ($p=4\times10^{18}$ $cm^{-3}$) of 0.2 μm thick are layered. The composition inclination multiple layer 3 has a structure wherein a composition inclination layer of 450 angstrom thick for one cycle is layered by eight cycles. Thereafter, the layers are etched to an intermediate location of the n-type InP clad 2 by reactive ion beam etching (RIBE) to form a rib waveguide. Finally, a positive electrode 6 and a negative electrode 7 are formed on an upper portion of the rib waveguide and the rear face of the substrate, respectively, thereby completing the device. It is to be noted that, in FIG. 1(a), reference numeral 8 denotes incident light, and 9 denotes transmission light.

According to an experiment conducted by the inventors, when the applied voltage was −2 V, the extinction ratio (=optical output on/optical output off) was higher than 13 dB. In this manner, with the optical modulation device of the electro-absorption type described above, a great change in absorption coefficient can be obtained with a low voltage. Further, when no electric field is applied, the optical modulation device of the electro-absorption type exhibits little absorption of light. Further, since the quantum level of positive holes of optical carriers absorbed and generated during application of an electric field, which particularly cause a problem of carrier pileup, is increased by a reverse electric field to decrease the substantial valence band discontinuity difference, there is another advantage that the problem of carrier pileup can be reduced. Consequently, since the removal of carriers is fast, no response deterioration occurs upon high rate modulation.

Subsequently, description will be given of production of another device according to the present invention wherein a DFB semiconductor laser having an active layer of a compositional inclination multiple structure and an electro-absorption semiconductor optical modulation device are integrated. Different steps of the process of production of the device are illustrated in FIGS. 2(a) to 2(c) and 3(a) to 3(c). A grating (diffraction grating) 11 was formed in the <011> direction only in a laser area of a (100) n-type InP substrate 1 (FIG. 2(a)), and an n-type InGaAsP guide layer 12 (wavelength: 1.3 μm, carrier concentration: $1\times10^{18}$ $cm^{-3}$, film thickness: 1,000 angstrom) and an n-type InP spacer layer 13 (carrier concentration: $1\times10^{18}$ $cm^{-3}$, film thickness: 500 angstrom) were grown on the entire area of the grating 11 (FIG. 2(b)).

Figure 2A:
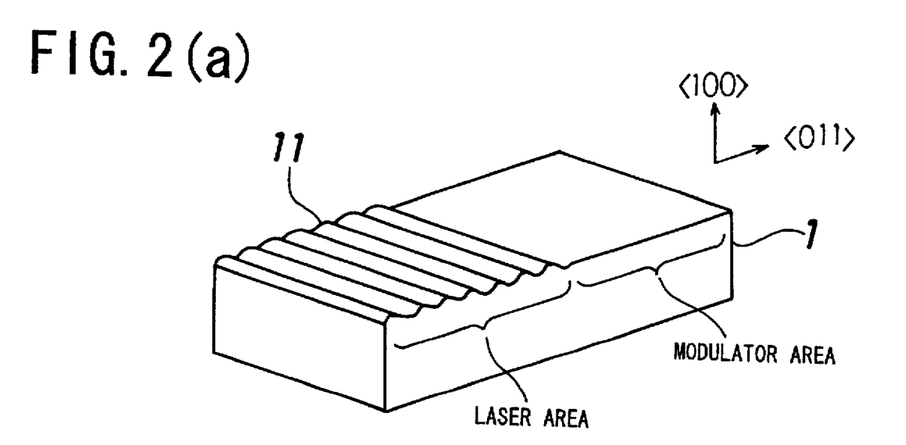
FIGS. 2(a), 2(b) and 2(c) and FIGS. 3(a), 3(b) and 3(c) are schematic perspective views showing different steps of a process of producing an integrated device of a distribution feedback semiconductor laser and an electro-absorption semiconductor optical modulation device to which the present invention is applied.
Figure 2B:
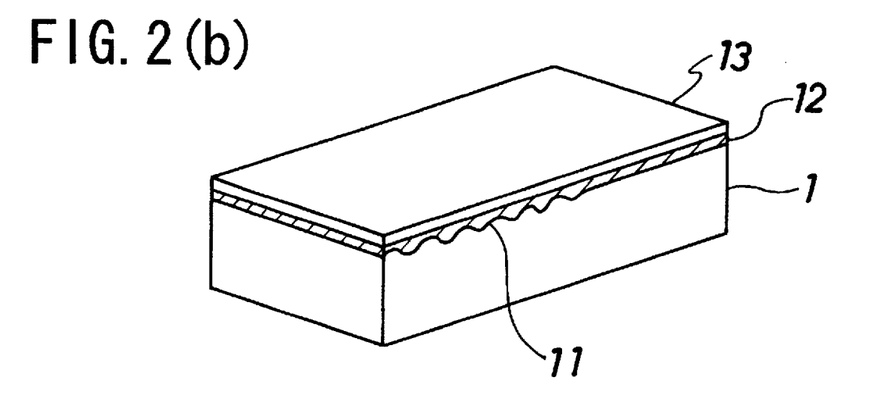
Figure 2C:
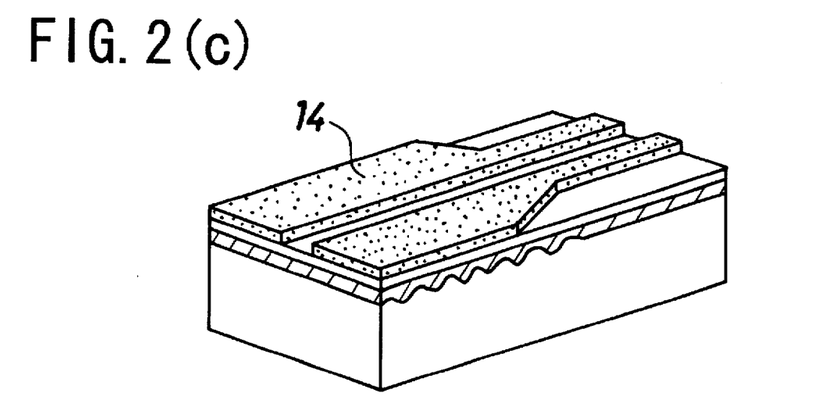

Then, a pair of stripes of a SiO$_2$ film 14 were patterned so that opposing side faces thereof extended in parallel to each other with the distance of 2 μm left therebetween and the width of the stripes thereof were 10 μm in a laser area but 6 μm in a modulator area (FIG. 2(c)). The transition area of the stripe width was 20 μm.

Thereafter, an n-type InP clad 15 (carrier concentration: $1\times10^{18}$ $cm^{-3}$, layer thickness: 500 angstrom), an InAlAs-InAlGaAs composition inclination multiple layer 16 and a p-type InP clad layer 17 (carrier concentration: $5 \times 10^{17}$ cm$^{-3}$, layer thickness: 500 angstrom) were selectively grown (FIG. 3(a)). Here, the composition inclination multiple layer 16 has a structure wherein a composition inclination layer of the film thickness of 450 angstrom for one cycle is layered by eight cycles. As a result, the wavelength of light generated from the active area was 1.50 μm, and the wavelength of light generated from the modulation area was approximately 1.47 μm.

Figure 3A:
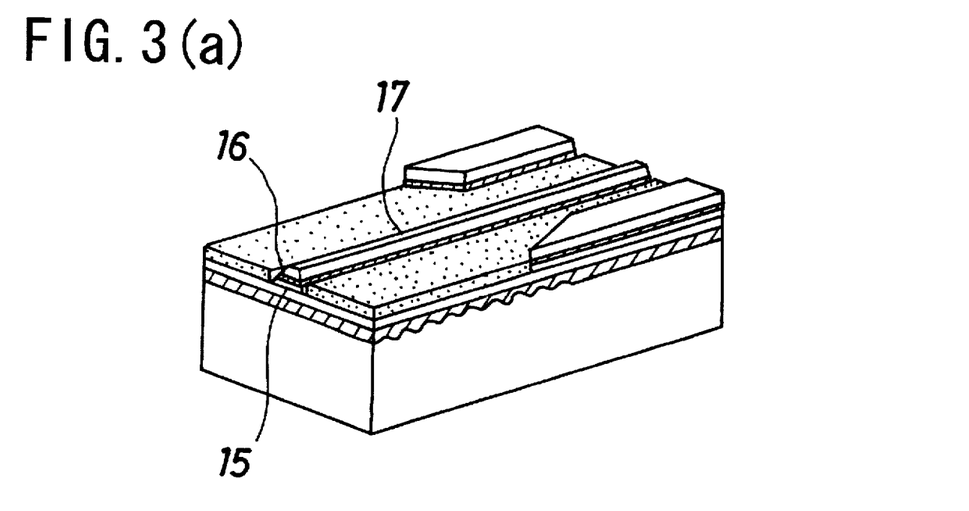
Figure 3B:
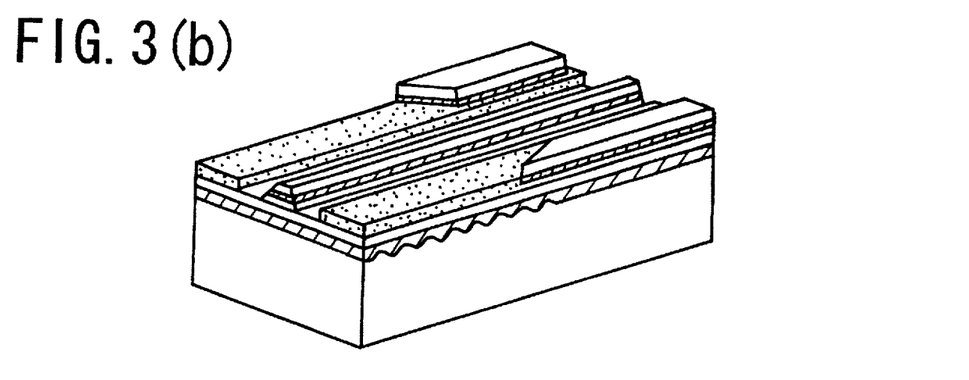

Then, the SiO$_2$ film 14 adjacent the waveguide area was removed with the width of 2 μm on the opposite sides of the waveguide area (FIG. 3(b)), and a p-type InP clad layer 17 (carrier concentration: $5 \times 10^{17}$ cm$^{-3}$, layer thickness: 1.5 μm) and a p$^+$-type InGaAs cap layer 18 (layer thickness: 0.3 μm, carrier concentration: $1 \times 10^{19}$ cm$^{-3}$) were selectively grown (FIG. 3(c)).

Figure 3C:
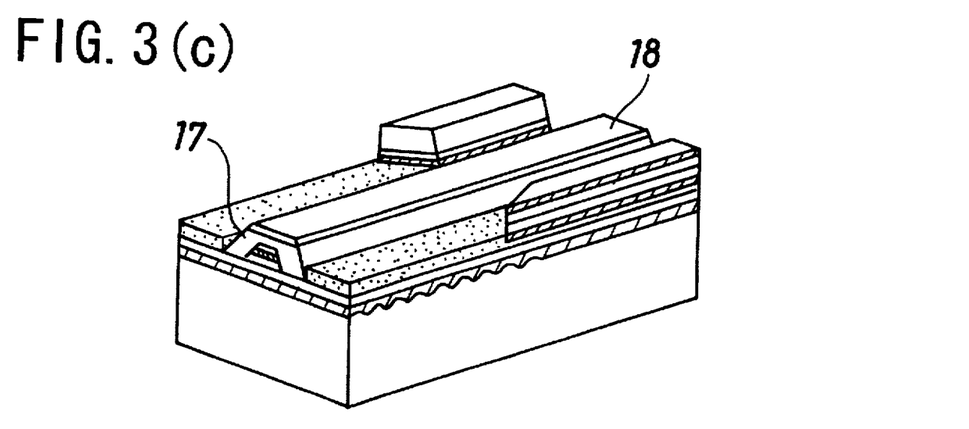

Finally, the SiO$_2$ layer formed over the overall area was opened to form a window over the laser and modulator areas of 20 μm long, and the p$^+$-type InGaAs cap layer 18 was removed by etching to establish electric isolation between the different areas. Then, a positive electrode was formed in the form of a pad, and an negative electrode was formed on the n-type InP substrate 1, thereby completing the device. The cloven laser area was 50 μm long, and the cloven modulator area was 200 μm long.

The oscillation threshold current of a typical one of devices produced in such a manner as described above was 20 mA, and the maximum CW light output from the modulator side of the device was 30 mW. The oscillation frequency was 1.51 μm, and the extinction ratio when $-2$ V was applied to the modulator area was 15 dB. Further, the coupling efficiency estimated from the extinction characteristic was a very high value of 98%. The separation resistance between the areas was 10 kΩ. Further, when $-2$ V was applied, extinction ratios higher than 13 dB were obtained with all of 20 devices sampled at random from the devices produced.

Subsequently, a Mach-Zehnder semiconductor optical modulation device to which the present invention is applied will be described with reference to FIGS. 4(a) and 4(b). The Mach-Zehnder semiconductor optical modulation device has a basic structure wherein an optical waveguide is branched into a pair of phase modulation waveguides and the phase modulation waveguides are joined into a single waveguide.

In production of the device, an n$^-$-type InAlAs-InAlGaAs (Eg=1.06 eV) composition inclination multiple layer 20 (n=$2 \times 10^{15}$ cm$^{-3}$), an n$^-$-type InP layer 21 (n<$01 \times 10^{15}$ cm$^{-3}$) of 0.1 μm thick, a p-type InP clad layer 23 (p=$5 \times 10^{17}$ cm$^{-3}$) of 1.5 μm thick and a p$^+$-type InGaAs contact layer 26 (p=$4 \times 10^{18}$ cm$^{-3}$) of 0.2 μm thick are layered on an n-type InP (100) substrate 19. Here, the composition inclination multiple layer 20 has a structure wherein a composition inclination layer of the film thickness of 450 angstrom for one cycle is layered by eight cycles. Thereafter, the layers are etched up to an intermediate portion of the p-type InP clad layer 23 by reactive ion beam etching (RIBE) to form a ridge 27. Finally, independent electrodes are provided on two phase modulation waveguides, and another electrode is provided on the rear face of the substrate, thereby completing the device.

Figure 4A:
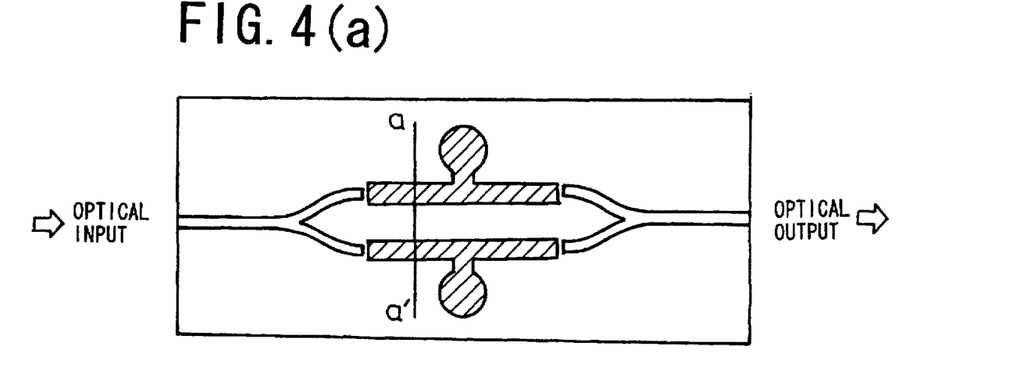
FIGS. 4(a) and 4(b) are a schematic top plan view and a schematic cross sectional view, respectively, of a semiconductor optical modulation device of the Mach-Zehnder type to which the present invention is applied.
Figure 4B:
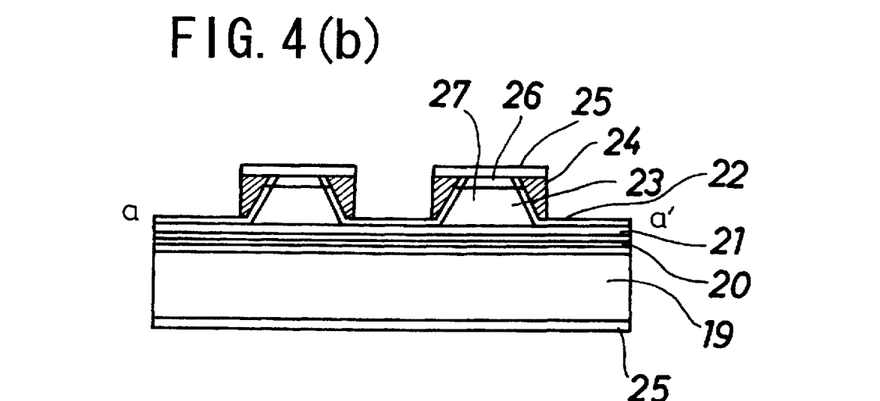
Figure 4C:
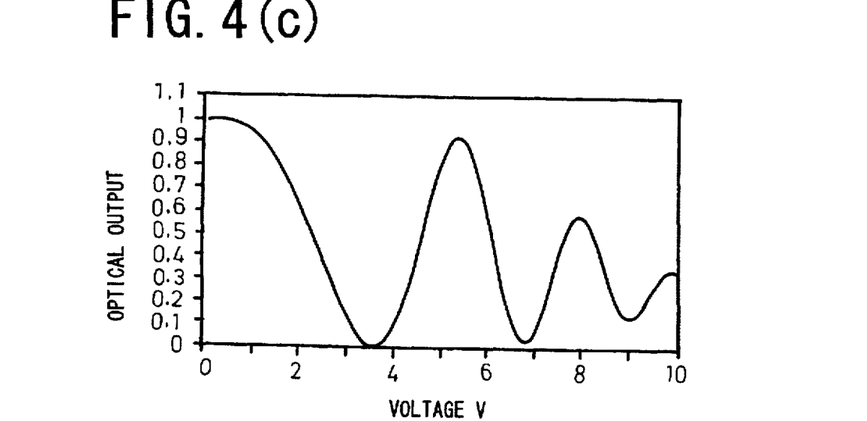
FIG. 4(c) is a diagram illustrating a extinction characteristic of the semiconductor optical modulation device of FIGS. 4(a) and 4(b) with respect to an applied voltage.
Figure 5A:
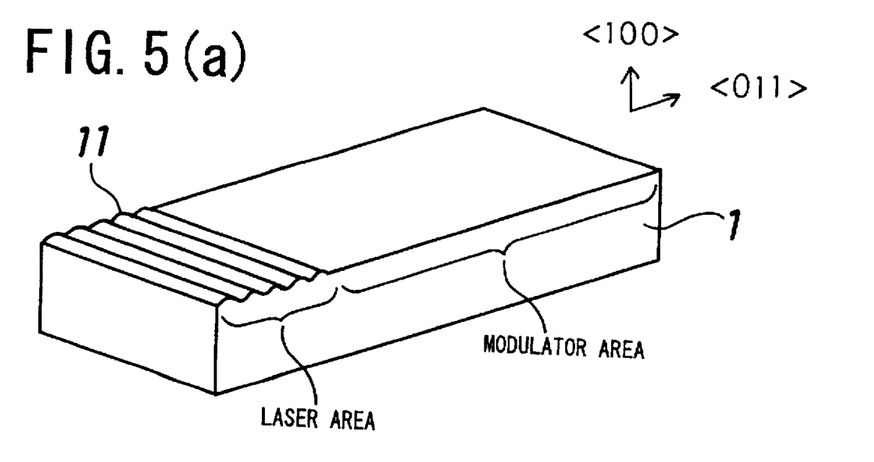
FIGS. 5(a), 5(b) and 5(c) and FIGS. 6(a) and 6(b) are schematic perspective views showing different steps of a process of producing an integrated device of a semiconductor laser of the distribution feedback type and a semiconductor optical modulation device of the refraction index controlled type to which the present invention is applied.
Figure 5B:
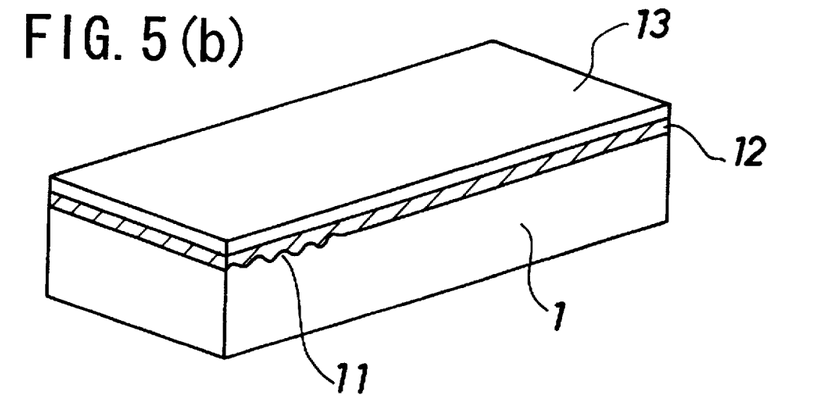
Figure 5C:
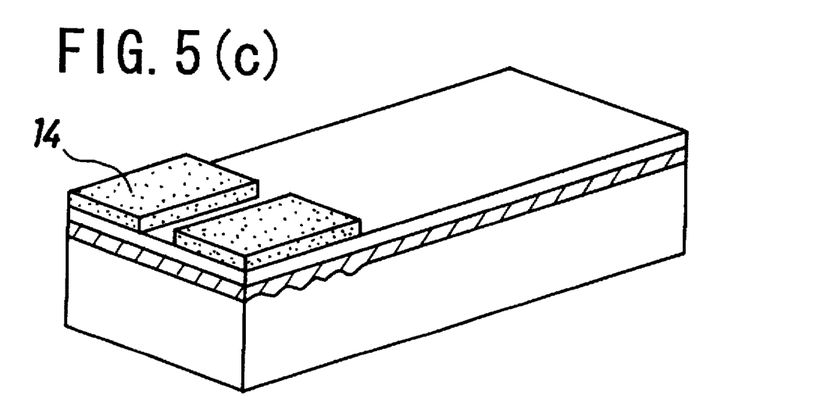

If light of the wavelength $\lambda_4 = 1.56$ μm is introduced into the optical semiconductor device of FIGS. 4(a) and 4(b) and a voltage is applied to one of the phase modulation waveguides, then the waveguide exhibits such a refraction index change as seen in FIG. 9(b), and consequently, in the joined output waveguide, a phase difference appears between the lights from the two phase modulation waveguides. Thus, modulation of light can be performed. The extinction characteristic of the Mach-Zehnder semiconductor optical modulation device of the present embodiment shown in FIGS. 4(a) and 4(b) with respect to the applied voltage is illustrated in FIG. 4(c). A high extinction ratio of 15 dB or more is obtained with the applied voltage of 3.5 V.

As apparently seen from FIG. 9(a), the present device exhibits little absorption of light of $\lambda_4 = 1.56$ μm. Accordingly, such a phenomenon as hole pileup caused by optical carriers hardly occurs, and consequently, the device operates essentially at a high speed. Further, since the change in absorption can be ignored, there is no problem that the extinction ratio is deteriorated by a change in loss of one of the phase modulation sections. It is to be noted that, in the device described above, reduction of the device capacitance to 0.5 pF or less is realized using polyimide 24 below each of the electrode pads in order to expand the frequency band which is limited by its CR time constant.

Subsequently, description will be given of production of a still further device according to the present invention wherein a DFB semiconductor laser having an active layer of a compositional inclination multiple structure and a Mach-Zehnder semiconductor optical modulation device are integrated. Different steps of the process of production of the device are illustrated in FIGS. 5(a) to 5(c) and 6(a) and 6(b). A grating (diffraction grating) 11 was formed in the <011> direction only in an laser area of a (100) n-type InP substrate 1 (FIG. 5(a)), and an n-type InGaAsP guide layer 12 (wavelength: 1.3 μm, carrier concentration: $1 \times 10^{18}$ cm$^{-3}$, film thickness: 1,000 angstrom) and an n-type InP spacer layer 13 (carrier concentration: $1 \times 10^{18}$ cm$^{-3}$, film thickness: 500 angstrom) were grown on the entire area of the grating 11 (FIG. 5(b)). Then, a pair of stripes of a SiO$_2$ film 14 were formed only in a laser area with the distance of 2 μm left therebetween and the width of 10 μm (FIG. 5(c)).

On the substrate with the masks formed in this manner, an n-type InP clad 15 (carrier concentration: $1 \times 10^{18}$ cm$^{-3}$, layer thickness: 500 angstrom), an InAlAs-InAlGaAs composition inclination multiple layer 16 and an n$^-$-type InP clad layer 21 (carrier concentration: $1 \times 10^{15}$ cm$^{-3}$, layer thickness: 500 angstrom) were selectively grown (FIG. 6(a)). Here, the composition inclination multiple layer 16 has a structure wherein a composition inclination layer of the film thickness of 450 angstrom for one cycle is layered by eight cycles. At this instance, the layers in the laser area between the masks are layered in a mesa structure while the layers in the modulator area free from a mask are layered in a flattened condition. As a result, the wavelength of light generated from the active area was 1.56 μm, and the wavelength of light generated from the modulation area was approximately 1.47 μm.

Then, a mask was formed again over the entire area of the semiconductor structure obtained in such a manner as described above, and the SiO$_2$ film 14 adjacent the laser area was removed with the width of 2 μm on the opposite sides of the laser area while at the same time the SiO$_2$ film 14 at a ridge formation portion of the modulator area was removed. Thereafter, a p-type InP clad layer 17 (carrier concentration: $5 \times 10^{17}$ cm$^{-3}$, layer thickness: 1.5 μm) and a p$^+$-type InGaAs cap layer 18 (layer thickness: 0.3 μm, carrier concentration: $1 \times 10^{19}$ cm$^{-3}$) were selectively grown to perform the burying growth of the laser section and the ridge growth of the modulator section (FIG. 6(b)).

Figure 6A:
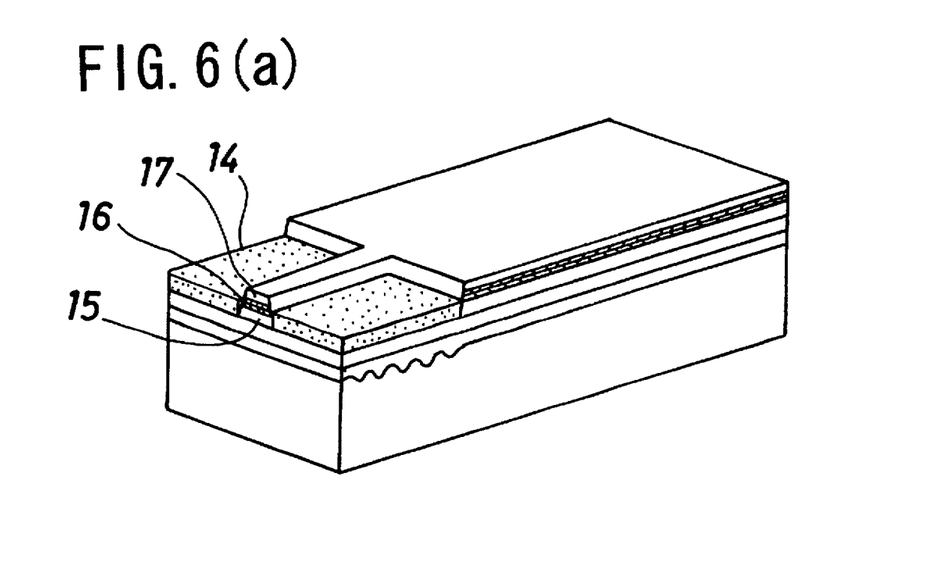
Figure 6B:
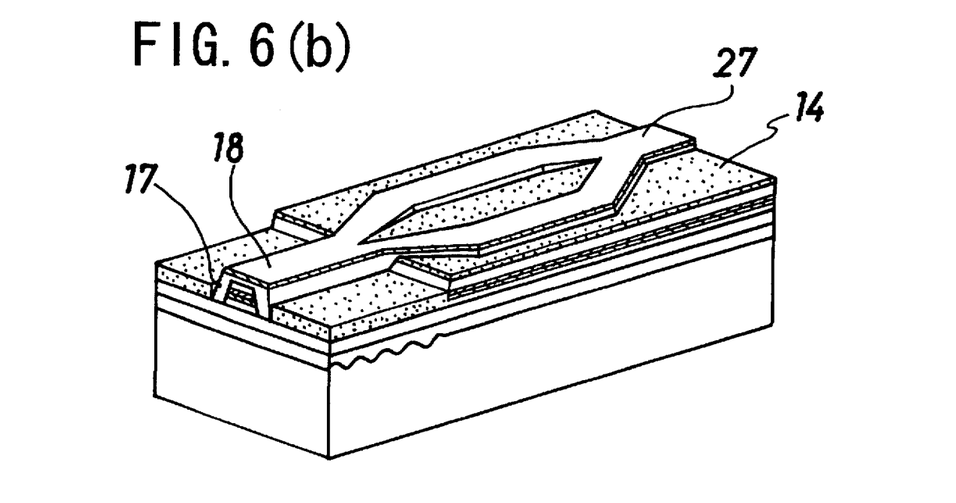

Finally, the SiO$_2$ film formed over the overall area was opened to form a window over the laser and modulator areas of 20 μm long, and the p⁺-type InGaAs cap layer 18 was removed by etching to establish electric isolation between the different areas. Then, a positive electrode was formed in the form of a pad, and a negative electrode was formed on the n-type InP substrate 1, thereby completing the device. The cloven laser area was 500 μm long, and the cloven modulator area was 600 μm long.

The oscillation threshold current of a typical one of devices produced in such a manner as described above was 20 mA, and the maximum CW optical output from the modulator side of the device was 30 mW. The oscillation frequency was 1.51 μm, and the extinction ratio when −4 V was applied to the modulator area was 15 dB. Further, the coupling efficiency estimated from the extinction characteristic was a very high value of 98%. The separation resistance between the areas was 10 kΩ. Further, when −4 V was applied, extinction ratios higher than 13 dB were obtained with all of 20 devices sampled at random from the devices produced.

While the preferred embodiments of the present invention are described above, some complementary description is given below. While an InAlAs-InAlGaAs composition inclination multiple layer is employed in the embodiments described above, any layer may be employed only if it has a composition inclination multiple layer structure in principle. For example, InAlAs-InGaAs, InAlGaAs-InGaAsP and InAlGaAs-AlGaAsSb composition inclination multiple layers can be employed. Further, in what form the waveguide structure of an optical modulation device formed using the composition inclination multiple layer structure should be formed or in what form the electric field application means should be formed in position may be determined suitably depending upon the wavelength of light to be used, the function to be performed and so forth.

Having now fully described the invention, it will be apparent to one of ordinary skill in the art that many changes and modifications can be made thereto without departing from the spirit and scope of the invention as set forth herein.

What is claimed is:

1. A semiconductor optical modulation device for modulating input light by a change in absorption of light when an electric field is applied thereto, comprising:

a semiconductor substrate; and a first clad layer of a first conduction type, a guide layer of the first conduction type, and a second clad layer of a second conduction type layered on said semiconductor substrate, wherein said guide layer includes a multiple layer formed from a plurality of semiconductor layers layered with each other, and wherein each of the plurality of semiconductor layers (a) has an energy gap, (b) is formed such that, as viewed from a first side to a second side in a thickness-wise direction, the content of an element of a first semiconductor composition on the first side gradually decreases until the second side exhibits a second semiconductor composition substantially void of the element, and (c) the energy gap exhibits a variation with a substantially linear slope, whereby the multiple layer formed from a plurality of semiconductor layers has a periodic potential that varies linearly.

2. A semiconductor optical modulation device as in claim 1, wherein said first semiconductor composition is InAlGaAs and said second semiconductor composition is InAlAs, and wherein the element is Ga and the content of Ga gradually decreases from said first semiconductor composition to said second semiconductor composition.

3. A semiconductor optical modulation device of a refraction index controlled type, comprising:

a semiconductor substrate;

a first clad layer of a first conduction type, a guide layer of the first conduction type, and a second clad layer of a second conduction type, wherein said first clad layer, said guide layer and said second clad layer are layered on said semiconductor substrate; and electric field application means for causing a change in a refractive index of the semiconductor optical modulation device;

wherein said guide layer includes a multiple layer formed from a plurality of semiconductor layers layered with each other, and wherein each of the plurality of semiconductor layers (a) has an energy gap, (b) is formed such that, as viewed from a first side to a second side in a thickness-wise direction, the content of a certain element of a first semiconductor composition on the first side gradually decreases until the second side exhibits a second semiconductor composition substantially void of the certain element, and (c) the energy gap exhibits a variation with a substantially linear slope, whereby the multiple layer formed from a plurality of semiconductor layers has a periodic potential that varies linearly.

4. A semiconductor optical modulation device as in claim 3, wherein said first semiconductor composition is InAlGaAs and said second semiconductor composition is InAlAs, and wherein the certain element is Ga and the content of Ga gradually decreases from said first semiconductor composition to said second semiconductor composition.

* * * * *